United States Patent

[11] 3,588,034

[72] Inventor: Jonathan S. Powell
1231 Brookmere Road, Pasadena, Calif. 91105
[21] Appl. No. 793,029
[22] Filed Jan. 22, 1969
[45] Patented June 28, 1971

[54] SHUTOFF VALVE
1 Claim, 6 Drawing Figs.
[52] U.S. Cl. .................................................. 251/8,
251/266, 285/189
[51] Int. Cl. ..................................................... F16k 7/06
[50] Field of Search............................................ 251/729;
285/209, 210

[56] References Cited
UNITED STATES PATENTS
1,779,712 10/1930 Poeppel.......................... 285/209
2,305,840 12/1942 Brown et al..................... 251/7X
FOREIGN PATENTS
1,133,076 11/1956 France........................... 251/8
582,032 11/1946 Great Britain................. 251/8

Primary Examiner—William F. O'Dea
Assistant Examiner—Richard Gerard
Attorney—Lyon and Lyon ABSTRACT: A shutoff valve in which a tubular valve body is provided with an elastomer lining sealed to the body at its extremities, and a transversely movable gate compresses the liner to force opposed walls of the liner into mutual engagement and form a seal.

PATENTED JUN 28 1971
3,588,034
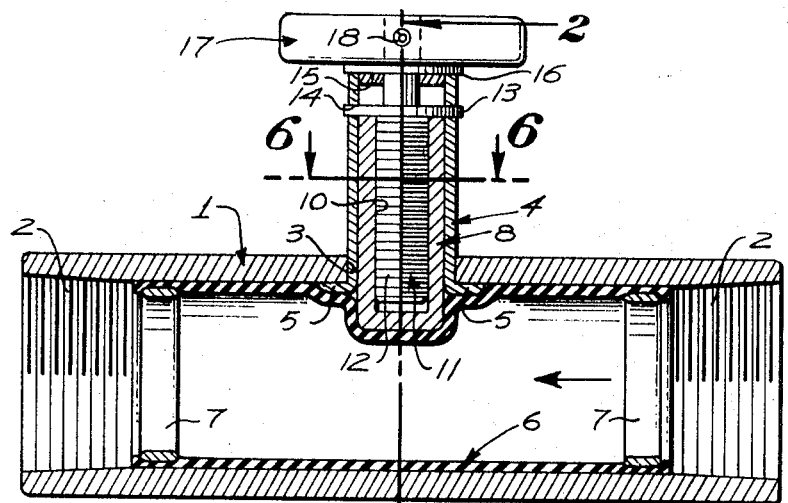
Fig. 1
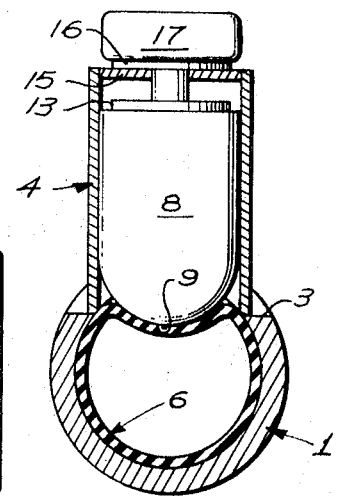
Fig. 2
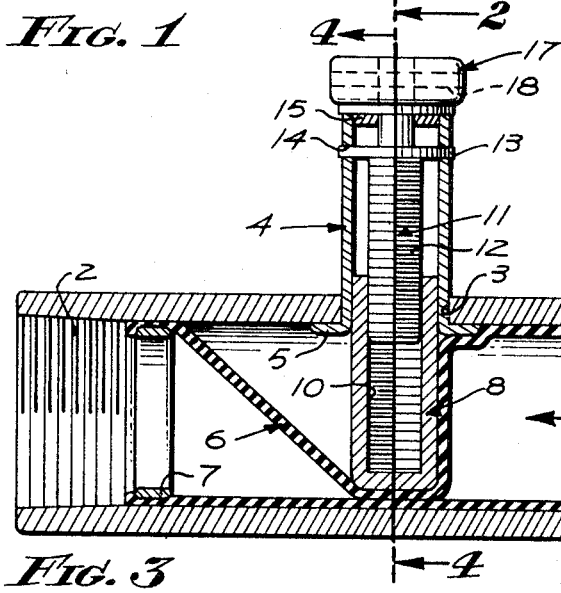
Fig. 3
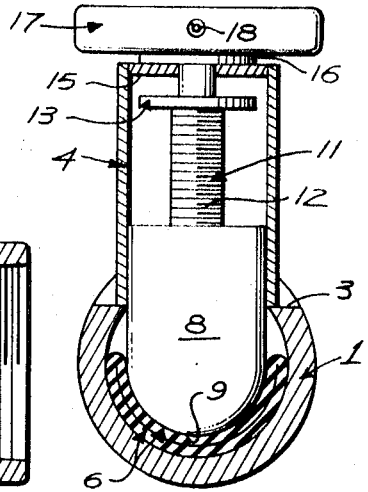
Fig. 4
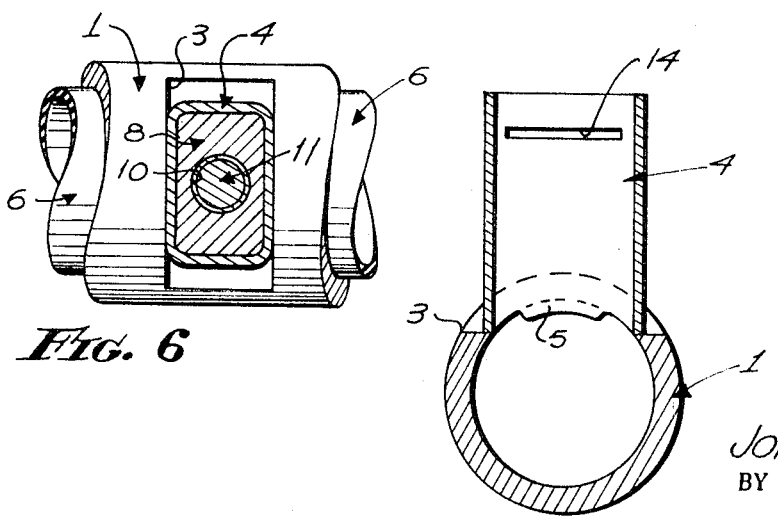
Fig. 6
Fig. 5
INVENTOR.
JONATHAN S. POWELL
BY
Lyon+Lyon
ATTORNEYS

SHUTOFF VALVE

SUMMARY OF THE INVENTION

This invention is summarized in the following objects:

First, to provide a shutoff valve in which a gate valve member is pressed radially against an elastomer lining to force opposed walls of the lining into mutual engagement thereby to form a seal.

Second, to provide an elastomer lined shutoff valve in which all fluid passing through the valve is confined within the liner so that the gate valve member and other operating elements are outside the fluid path, thereby eliminating the need for sealing glands or the equivalent.

Third, to provide a shutoff valve which is particularly inexpensive to manufacture, and which by selection of appropriate elastomers, may be arranged to control various gasses or liquids.

DESCRIPTION OF THE FIGURES

FIG. 1 is a longitudinal sectional view of the shutoff valve, shown in its open position.

FIG. 2 is a transverse sectional view, taken through 2-2 of FIG. 1, with portions shown in elevation.

FIG. 3 is a longitudinal sectional view of the shutoff valve, shown in its closed position.

FIG. 4 is a transverse sectional view, taken through 4-4 of FIG. 3, with parts shown in elevation.

FIG. 5 is a transverse sectional view, similar to FIGS. 1 and 4, but showing only the valve body and the guide tube.

FIG. 6 is a fragmentary sectional view, taken through 6-6 of FIG. 1.

The shutoff valve includes a valve body 1, which is tubular, and is provided at its ends with internal screwthreads 2. Intermediate its ends, the valve body 1 is provided with a rectangular side slot 3 which receives a valve guide tube 4 of rectangular cross section. The tube 4 is held in place by laterally folded retainer lugs 5 which engage the inner wall of the body 1 at opposite sides of the slot 3.

The valve body 1 receives an elastomer sleeve 6, which extends the length of the valve body between the screw-threaded ends 2. Adjacent each end, the elastomer sleeve 6 receives a retainer ring 7. Each retainer ring is formed of metal and is inserted within the elastomer sleeve and then expanded by a suitable tool so that the end of the elastomer sleeve is in sealing engagement with the confronting wall of the body member. The elastomer which comprises the sleeve 6 varies, depending upon the type of liquid or gas to be controlled by the shutoff valve. In many cases, rubber is satisfactory; in other cases, a butyl rubber is employed. In other cases, a silicone type of rubber is employed.

The valve guide tube 4 receives a gate valve member 8. The gate valve is rectangular in cross section and is provided with a semicylindrical inner end 9. A screw-threaded socket 10 extends into the gate valve from its outer end. A valve stem 11 is provided which includes a screw-threaded inner portion 12, adapted to fit within the socket 10. The outer portion of the stem protrudes from the gate valve and is provided with a thrust washer 13, which is held against axial displacement by means of a pair of slots 14 formed in the opposite walls of the valve guide tube 4. The slots 14 are of sufficient width that the thrust washer may be inserted laterally therein prior to assembly of the valve tube 4 on the valve body.

The outer end of the valve guide tube 4 is closed by a rectangular plate 15, and a thrust washer 16 overlies the end of the valve guide tube. The protruding end of the stem 11 receives a handle 17, held in place thereon by a pin 18.

Operation of the shutoff valve is as follows:

When the valve is in its open position, as shown in FIGS. 1 and 2, the gate valve 8 may project slightly within the body member. It will be noted that the inner end of the gate valve is lined by the elastomer sleeve 6 so that the gate valve is not exposed to the fluids which are to flow through the valve.

The valve is closed by forcing the gate valve 8 inwardly from the position shown in FIG. 1 and FIG. 2 to the position shown in FIGS. 3 and 4. The elastomer sleeve 6 continues to cover the protruding end of the gate valve in the manner shown in FIGS. 1 and 2 until the elastomer sleeve is squeezed upon itself, as shown particularly in FIG. 4, completely closing the valve. If on closing the valve, the downstream pressure is completely relieved the downstream portion of the elastomer sleeve assumes the position shown in FIG. 3. If, however, pressure remains downstream, the elastomer sleeve conforms to the inwardly protruding portion of the gate valve, as shown at the upstream side thereof.

While a particular embodiment of this invention has been shown and described, it is not intended to limit the same to the details of the construction set forth, but instead, the invention embraces such changes, modifications and equivalents of the various parts and their relationships as come within the purview of the appended claim.

I claim:
1. A shutoff valve, comprising:
   a. a tubular valve body of uniform external and internal diameter having internal screw threads at each end for installation in a pipeline and a transverse slot at its midportion;
   b. a sleeve formed of elastomeric material lining the walls of the valve body;
   c. ring means for pressing the extremities of the sleeve into sealing engagement with the interior walls of the valve body, said sleeve, between the ring means, being free to fold radially inwardly from the interior walls of the valve body;
   d. a tubular valve guide of rectangular cross section received at one end in the slot, the valve guide including lateral retaining tabs engaging the inner wall of the body, and lateral slots near its outer end;
   e. a gate valve member of rectangular cross section, slidable in the valve guide and movable into the valve body to pinch the walls of the sleeve into mutual sealing relation, the gate valve member having a screw-threaded socket;
   f. a screw member fitting the socket for advancing and retracting the gate valve member and having a shoulder near its outer end;
   g. a retainer disc fitting the shoulder of the screw member and received in the valve guide slots to prevent axially outward movement of the screw member when advancing the gate valve member; and
   h. a handle for turning the screw member.